Figure 1:
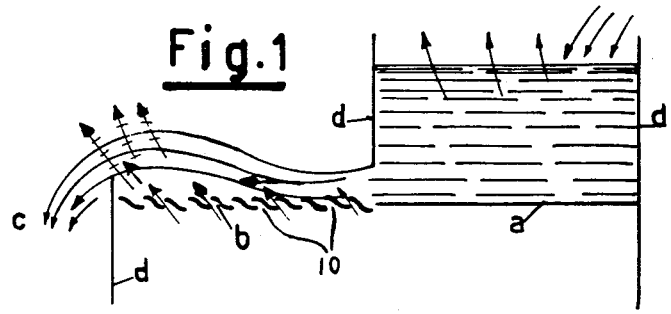

June 26, 1956  W. KITTEL  2,752,138
CONTACT PLATE STRUCTURE FOR USE IN
A RECTIFYING OR CONTACTING COLUMN
Filed July 15, 1952  2 Sheets-Sheet 1

INVENTOR.
Walter Kittel
BY Henry K. Feist
Attorney

June 26, 1956 W. KITTEL 2,752,138
CONTACT PLATE STRUCTURE FOR USE IN
A RECTIFYING OR CONTACTING COLUMN
Filed July 15, 1952 2 Sheets-Sheet 2
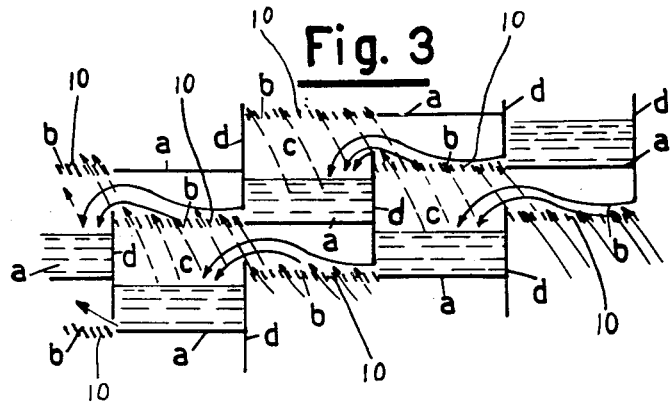
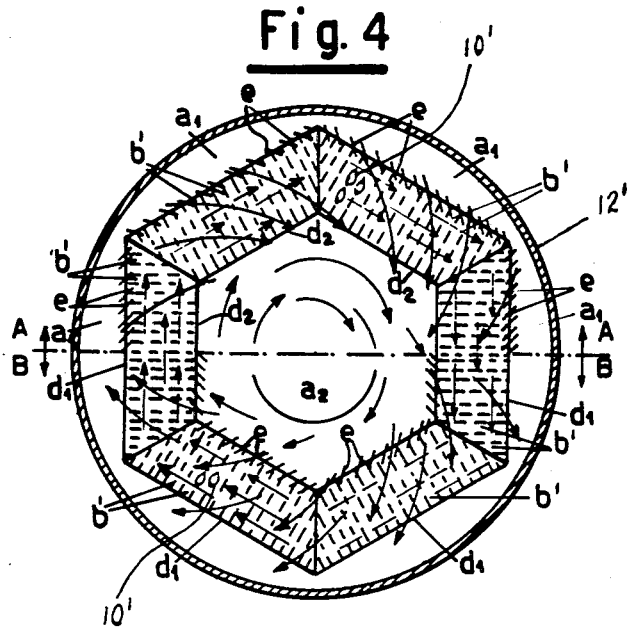
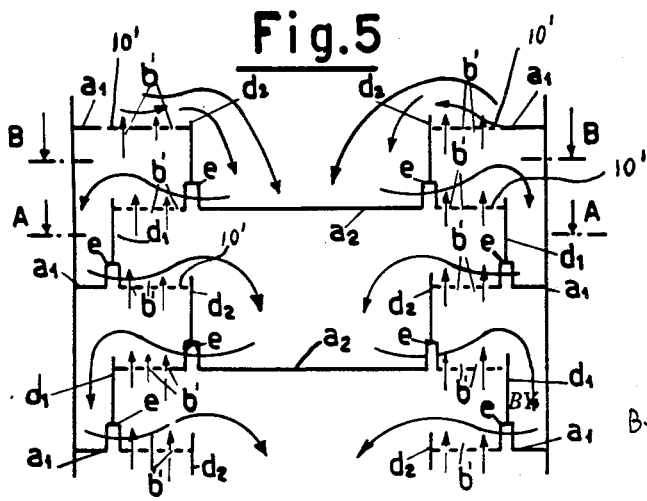
INVENTOR.
Walter Kittel
By Henry K. Feist
Attorney United States Patent Office 2,752,138
Patented June 26, 1956

2,752,138
CONTACT PLATE STRUCTURE FOR USE IN A RECTIFYING OR CONTACTING COLUMN

Walter Kittel, Gmunden, Austria

Application July 15, 1952, Serial No. 299,036

Claims priority, application Austria July 16, 1951

12 Claims. (Cl. 261—113)

This invention relates to rectifying or contacting columns wherein two or more media of different specific weight are conducted towards each other in counter-current, and more particularly to structures of contact plates for use in this type of contacting columns.

In all direct countercurrent apparatus, for example distilling columns, absorption columns, washing towers, cooling towers, extraction columns, or the like, wherein two or more media of different specific weight are conducted towards each other in countercurrent, there is the task to cause repeatedly a contact, as intimate as possible, between media conducted through the apparatus so as to obtain the desired one-sided or mutual influence of one medium upon the other during the path of the media through the apparatus.

For this reason, in most cases above mentioned apparatus are equipped with installations, by means of which a distribution, as fine as possible, of the ascending lighter medium in the heavier, descending medium shall be enforced, so that in this manner, i. e. by the provisions of a contacting surface, as large as possible, the process of diffusion is facilitated or accelerated respectively.

Moreover, it has been found out already, that the intensity of the diffusion does not depend solely on the size of the contacting surface provided for by the above mentioned installations for the media conducted in counter-current through the apparatus, that, however, the intensity of the diffusion mainly depends on the speed of continuous renewal of the boundary layers of this exchange surface. Therefore, installations for columns are already known, which, based on said cognizance, make use of the kinetic energy of the lighter medium, ascending in the apparatus, for the generation of certain conditions of flow, so that the processes of diffusion are intensified in the sense of above mentioned assumptions.

In most of the customary direct counter-current processes, wherein the specifically lighter medium consists of gases or vapors and the specifically heavier medium consists of a liquid and wherein the ascending gases or vapors in comparison with the descending liquid, on one hand, are considerably lighter in specific respect and, on the other hand, have a volume being a multiple of the volume of the liquid, the above mentioned feature may be obtained in such a manner that the gases or vapors passed through the contact plates of the columns in a finely distributed manner cause by a corresponding orientation of the passages for the gases a strong rotation of the layers of liquid, being on the contact plates, about the vertical axis of the apparatus. Apart from the thus resulting continuous renewal of the exchange surface, owing to the simultaneously generated centrifugal forces this method of operation also has the advantage of a thorough disassociation of the media automatically following the intensive mixing thereof and being just as effective as the latter, as the drops of liquid carried along in the stream of gases or vapors are considerably more intensively and more completely separated in this kind of contact plates than in standard contact plates, for example in contact plates of the bell-cap- or sieve-type. It will be readily understood that the last mentioned phenomenon is of the same significance for the desired total effect of the respective counter-current apparatus as the previously characterized requirements of an intensive mixing and renewal of the surface respectively of the media to be subjected to the exchange, as, otherwise, the principle of counter-current would be considerably impaired or even nullified.

There are, however, limits to the application of this cognizance, as the obtainment of the described effect requires a certain minimum ratio of the available kinetic energy of the medium ascending in the apparatus to the mass of the medium descending in the apparatus in counter-current thereto, as otherwise, the kinetic energy of the lighter medium is insufficient with respect to the mass of the heavier medium.

This last mentioned feature holds good especially in gas washing processes with low solubility of the substance to be washed out from the gas, for example $CO_2$ or $C_2H_2$ in water, as well as in continuous counter-current-extraction-processes, as in the first instance the large mass of the liquid and in the second instance the small buoyancy of the specifically lighter liquid prevents the taking place of an effective rotation of the media about the vertical axis of the column. Therefore, the use of hitherto known, dynamically effective installations for columns does not bring about improvements in such instances.

On the other hand, above explanations relating to the process of diffusion clearly indicate, that such a rotation of the media to be subjected to an exchange has great advantages especially in the last mentioned instances, as, on one hand, the process of diffusion, proceeding considerably slower in liquids, is accelerated and, on the other hand, the dissociation of the media becoming necessary subsequent to each contact thereof is increased or improved respectively.

An object of the invention is to provide a contact plate arrangement for use in rectifying or contacting columns, by means of which the above mentioned advantages—as a result of the rotation of the media, to be subjected to an exchange, on the contact plates—may be fully obtained also in connection with the last mentioned processes.

Another object of the invention is to improve on the construction of contact plates as now customarily made.

Figure 2:
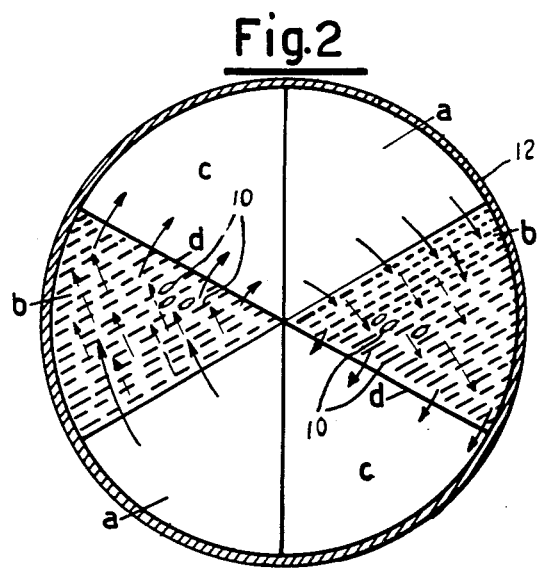
Figure 6:
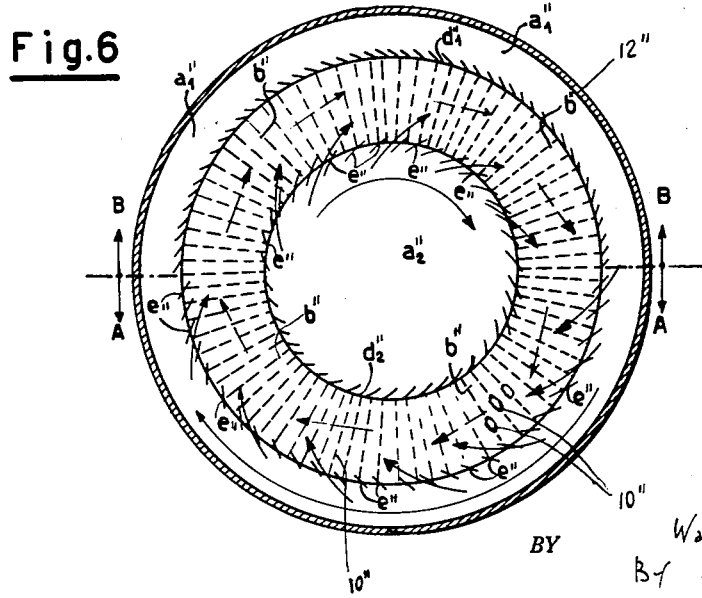

Other objects and structural details of the invention will be apparent from the following description when read in conjunction with the accompanying drawings forming part of this specification, wherein:

Fig. 1 diagrammatically illustrates the principle of construction of a contact plate arrangement according to the invention, Fig. 2 is a somewhat diagrammatical top plan view of a structure of contact plates according to the invention, inserted into a contacting column shown in section, Fig. 3 is a developed layout of the structure of contact plates shown in Fig. 2, Fig. 4 is a somewhat diagrammatical top plan view of another embodiment of a structure of contact plates according to the invention, inserted into a contacting column shown in section, the upper half of said Fig. 4 being a section made on the plane represented by line A—A of Fig. 5 and the lower half of said Fig. 4 being a section made on the plane represented by line B—B of Fig. 5, Fig. 5 is a vertical sectional view of the structure shown in Fig. 4, and Fig. 6 is a somewhat diagrammatical top plan view of a further embodiment of a structure of contact plates according to the invention, inserted into a contacting column shown in section, the upper half of said Fig. 6 being a section made on a plane corresponding to the plane B—B in Fig. 5, and the lower half of said Fig. 6 being a section made on a plane corresponding to the plane A—A in Fig. 5.

Fig. 1 diagrammatically illustrates an arrangement of a contact plate according to the invention by means of which the advantages resulting from the rotation of the media on the contact plate may be fully obtained also in connection with gas washing processes with low solubility of the substance to be washed out from the gas or in continuous counter-current-extraction-processes. According to the invention this feature is obtained when the dynamic principle of operation of the contact plates is also applied to the heavier medium by the use of special outlets for said heavier medium and when in this arrangement by a suitable design of said outlets a periodically changing acceleration and retardation respectively of the speed of flow of said heavier medium is obtained.

If in such an instance the heavier medium is conducted from contact plate to contact plate of such a structure through special outlet pipes or outlet pockets offering a sufficiently large cross-section for the flow of the medium and if said heavier medium is discharged through discharge openings, of reduced cross-sections, of said outlet pipes or pockets onto each successive contact plate—perhaps by the use of special guide plates—in uniform direction and in the same sense as the lighter medium emanating from the passages of the contact plates in a tangential or approximately tangential direction to symmetrical configuration having the centers of symmetry thereof in the vertical axis of the apparatus, rotating flows are necessarily formed on the individual contact plates, as in this case the static height of the mass of the heavier medium or its potential energy respectively, converted into kinetic energy, is added to the kinetic energy of the specifically lighter medium emanating from the passages of the contact plates.

Fig. 1 diagrammatically illustrates the principle for the realization of the required succession of accelerated and retarded flow of the heavier medium (indicated by full line arrows) in cooperation with the lighter medium (indicated by dash line arrows). The heavier medium is dammed in the outlet pocket, laterally defined by the bulkheads $d$ and the bottom plate $a$, owing to the reduction of the cross-section of the discharge opening arranged at one side of the pocket above its bottom; thus, as indicated in the drawing, the degasifying process, i. e. dissociation of the lighter medium still carried along from the preceding zone of exchange is assured. At the same time, owing to said reduced cross-section of the discharge opening the heavier medium leaves said throttling point at a high speed thus causing subsequently an effect of cavitation at the passages 10 for the lighter medium oriented in the same sense of flow whereby, as a result of the thus generated effect of suction the resistance to be overcome by the lighter medium during its passage through the passages of the contact plate is considerably reduced. The thus obtained intensive mixing of the two media within the zone $b$ of contact and exchange may be readily gathered from the path of flow indicated in Fig. 1.

In order to favor the dissociation of the lighter medium from the heavier medium required subsequently to said intensive mixing, the zone $b$ of contact is limited at its rear end in a suitable manner by an overflow weir, which, as shown in Fig. 1, is formed by an upward extension of the bulkhead $d$ at the (left hand) end of the zone $b$ of contact; said overflow weir acts as a baffle plate.

The rotation of the media on the contact plates of a structure according to the invention taking place simultaneously with the above described effects may be gathered from Fig. 2 illustrating, as an example, a structure of contact plates divided into 6 sectors. According to the embodiment shown in said Fig. 2 the first pair of oppositely arranged sectors is designed as bottom surface $a$ of the outlet pockets, the next pair of oppositely arranged sectors is designed as a zone $b$ of contact with corresponding orientation of the passages 10 for the lighter medium, and the following pair of oppositely arranged sectors $c$ is left free for receiving the discharged heavier medium.

The inclined passages 10 for the lighter medium are arranged in parallel rows. For example, said passages may be of the design and construction as described in my U. S. Patent No. 2,568,749, granted September 25, 1951, and shown in Figs. 8 and 9 thereof or as described and shown in my copending patent application Serial No. 274,994 filed March 5, 1952. The arrangement of the direction of the outlets of said passages 10 relative to each other and relative to the vertical axis of the structure of contact plates is chosen in such a way that the lighter medium is uniformly discharged in a tangential or substantially tangential direction relative to symmetrical polygons or circles having their centers of symmetry in the vertical axis of the structure.

The structure of contact plates is arranged within the wall 12 of a rectifying or contacting column at a suitable place thereof.

As shown in Figs. 2 and 3, the discharge of the heavier medium (full line arrows) in a uniform direction, substantially equal to the direction of flow of the lighter medium, from contact plate to contact plate is obtained by radially arranged bulkheads $d$ connecting the zone $b$ of exchange of a contact plate with the bottom surface $a$ of the outlet pocket of the next following contact plate whereby the paths of flow of both media are definitely determined.

Furthermore, Fig. 3 clearly indicates the continuous change of acceleration and retardation of the speed of flow of the heavier medium for the purpose mentioned above. Above all it may be gathered from Fig. 3 that according to this embodiment, the influence on the speed of flow may be readily obtained by a downward extension of the radially arranged bulkheads $d$ beyond the bottom surfaces $a$ whereby a sluice of reduced cross-section is formed between the lower edge of the extended bulkhead and the next lower contact plate. Moreover, Fig. 3 illustrates the path of the specifically lighter medium (dash line arrows) from contact plate to contact plate. Thus, the path of the two media in the above described embodiment corresponds, in principle, to a double-thread screw or possibly to a multiple-thread screw. It is obvious that in this manner, i. e. by the omission of the hitherto customary continuous changes of direction of the flowing media from contact plate to contact plate, the throughput of the media may be considerably increased, in addition to above described effects of flow.

Figs. 4 and 5 illustrate a different embodiment of a structure of contact plates according to the invention. Again, the structure is divided into a plurality of sectors, for example 6 sectors, and the direction of flow of the two media on the plates takes place in the same sense.

In addition to these features, however, the heavier medium does not only flow in the shape of a screw from the top of the structure towards the bottom thereof, but the heavier medium flows also simultaneously in a radial direction alternatively from the inside to the outside and vice versa over the contact plates of the structure. According to the embodiment shown in Figs. 4 and 5, the individual contact plates of the structure are not in the shape of a sector, they are, however, in the shape of a hexagon corresponding to the division of the structure into 6 sectors. The exchange zones $b'$ proper having passages 10′ for the lighter medium adjoin alternatively at the outside and at the inside the bottom surfaces $a_1$ and $a_2$ respectively of the outlet pockets of the contact plates which are arranged above the respective exchange zone. Furthermore, said exchange zones $b'$ adjoin the bulkheads $d_1$ and $d_2$ which are alternatively arranged at the outer side and at the inner side of said exchange zones $b'$. In each plane the series of bulkheads $d_1$ and the series of bulkheads $d_2$ are arranged in the shape of a hexagon. The inclined passages $10'$ of the exchange zone $b'$ are designed in the manner as described above in connection with the passages 10 of the embodiment shown in Figs. 2 and 3; the parallel rows of passages $10'$ are arranged in the zone $b'$ in such a way that the lighter medium is uniformly discharged in a tangential or substantially tangential direction relative to the vertical axis of the structure. According to the embodiment shown in said Figs. 4 and 5 some of the outlet pockets are formed by the space between the bulkheads $d_1$ and the wall $12'$ of the contacting column and some of the outlet pockets are formed by the central hexagonal space defined by the inner bulkheads $d_2$. Thus the heavier medium flows alternatively from the inside and from the outside over the exchange zone $b'$ being arranged between the outer set of bulkheads $d_1$ and the inner set of bulkheads $d_2$. As will be readily understood, the structure shown in Figs. 4 and 5 has 3 concentrical zones, an inner zone ($a_2$), an intermediate zone ($b'$) and an outer zone ($a_1$).

According to the embodiment shown in Figs. 4 and 5 the desired rotation is obtained by the following arrangement: The sets of bulkheads $d_1$ and $d_2$ preventing the ascending specifically lighter medium from evading the zones $b'$ of exchange are provided at their lower ends at the sluices with guide plates $e$ extending downwardly to the next lower contact plate. Said guide plates $e$ cause a twist of the heavier medium passing between said plates, said twist being of the same direction as the twist of the lighter medium passing through the passages $10'$.

A special advantageous feature of the embodiment according to Figs. 4 and 5 may be found in the fact that the path of flow of the heavier medium over the zone of exchange is of uniform length at all points. Furthermore, the ratio between the cross-section of the column and the length of the sluice formed between the lower edge of the bulkheads $d_1$ and $d_2$ and the contact plate arranged below such a bulkhead remains unchanged, while according to the embodiment of Figs. 2 and 3 said ratio is shifted with increasing diameter of the column in disfavor of the length of the sluice thus requiring an increasing distance of the lower edge of the bulkhead from the contact plate for assuring a discharge of the heavier medium.

Moreover, however, the embodiment according to Figs. 4 and 5 has the important advantage with respect to the method that in the central discharge portion of each second contact plate the desired dissociation process is very much favored by the centrifugal effect caused according to the "law of twisting forces" by the greatly increasing angular speed during the movement of the heavier medium from the outside to the inside.

Of course, any other shape from a square to a circle may be chosen instead of a hexagon for the contact plates of the embodiment according to Figs. 4 and 5, whereby the shape of the zone of exchange is altered accordingly.

According to Fig. 6, for example, the contact plates inserted into the cylindrical column $12''$ and the bulkheads $d_1''$ and $d_2''$ are in the shape of circles, whereby the zones $b''$ of exchange and the bottoms of the outlet pockets $d_1''$ obtain the shape of rings. Furthermore, while in the embodiments with polygonal shape of the contact plates (see for example Figs. 4 and 5) the rows of passages $10'$ are parallel to each other in each sector, the rows of passages $10''$ in contact plates of circular shape as shown in Fig. 6 extend in a radial direction.

I have described preferred embodiments of my invention, but it is understood that this disclosure is for the purpose of illustration and that various omissions or changes in shape, proportion and arrangement of parts, as well as the substitution of equivalent elements for those, herein shown and described, may be made without departing from the spirit and scope of the invention as set forth in the appended claims.

What I claim is:

1. In a structure of contact plates, for use in a rectifying or contacting column wherein a specifically heavier medium flowing in descending direction and a specifically lighter medium flowing in ascending direction are brought into intimate contact, said structure comprising: a series of contact plates arranged at different levels, each of said contact plates including a first non-perforated portion forming a bottom and a second perforated portion forming the base of a zone of contact between the media, a plurality of walls joining each of said non-perforated bottoms so as to form in conjunction with the latter a container capable of receiving the heavier medium, each of said perforated portions having a plurality of passages for the passage of the lighter medium and said passages being arranged for discharging the lighter medium in a uniform substantially tangential direction relative to the symmetrical configuration having the centers of symmetry thereof in the vertical axis of said structure, one of said walls of each container having a discharge opening communicating with the associated zone of contact of the contact plate for discharging the heavier medium from said container to said zone of contact in a uniform direction substantially parallel to the direction of flow of the lighter medium discharged from the passages of the perforated portion into said zone of contact whereby rotating flows of the media having substantially parallel directions are obtained at said passage for the lighter medium, and each zone of contact with the exception of the lowermost communicating with the container arranged on the next lower contact plate for conducting the heavier medium to said container, the non-perforated portion of said contact plates being alternatively arranged at the outer side and at the inner side of the perforated portion of said plates in successive levels whereby the discharge of the heavier medium from a container to a zone of contact occurs alternatively in successive levels at the outer side and at the inner side of said zone of contact and whereby the discharge of the heavier medium from a zone of contact to a container occurs alternatively in successive levels at the inner side and at the outer side of said zone of contact.

2. In a structure of contact plates as claimed in claim 1, the non-perforated portion of said contact plates being alternatively arranged at the outer side and at the inner side of the perforated portion of said plates in successive levels, and the perforated portions of said contact plates being identical in all levels and being arranged one below the other whereby three concentrically arranged zones, an outer zone for passing the heavier medium, an intermediate zone of contact and an inner zone for passing the heavier medium are formed in said structure.

3. In a structure of contact plates as claimed in claim 1, the non-perforated portion of said contact plates being alternatively arranged at the outer side and at the inner side of the perforated portion of said plates in successive levels, the perforated portions of said contact plates being identical in all levels and being arranged one below the other whereby three concentrically arranged zones, an outer zone for passing the heavier medium, an intermediate zone of contact and an inner zone for passing the heavier medium are formed in said structure, and the walls of the containers adjoining the zones of contact being arranged in the shape of a polygon.

4. In a structure of contact plates as claimed in claim 1, the non-perforated portion of said contact plates being alternatively arranged at the outer side and at the inner side of the perforated portion of said plates in successive levels whereby the discharge of the heavier medium from a container to a zone of contact occurs alternatively in successive levels at the outer side and at the inner side of said zone of contact and whereby the discharge of the heavier medium from a zone of contact to a container occurs alternatively in successive levels at the inner side and at the outer side of said zone of contact, and a series of guide plates arranged at each discharge opening of the containers for subjecting the heavier medium discharged from the container to a twist.

5. In a structure of contact plates as claimed in claim 1, the non-perforated portion of said contact plates being alternatively arranged at the outer side and at the inner side of the perforated portion of said plates in successive levels, the perforated portions of said contact plates being identical in all levels and being arranged one below the other whereby three concentrically arranged zones, an outer zone for passing the heavier medium, an intermediate zone of contact and an inner zone for passing the heavier medium are formed in said structure, and the walls of the containers adjoining the zones of contact being arranged in the shape of a circle.

6. In a structure of contact plates, for use in rectifying or contacting columns having a substantially vertical axis for direct counterflow processes requiring an intimate contact between a relatively heavy medium and a relatively light medium, said structure comprising: at least two contact plates arranged at different levels, said contact plates defining two exchange zones arranged in series, a plurality of passages for said relatively light medium, said passages being arranged in said contact plates in a plurality of parallel series so as to lead with uniformly inclined escaping directions through said exchange zones, separate inlets and outlets arranged in said exchange zones for said relatively heavy medium, and steadying zones arranged, respectively, upstream of said exchange zones so as to be associated with said contact plates, respectively, said relatively heavy medium entering said steadying zone associated with one of said contact plates from said outlet of the preceding exchange zone, said relatively heavy medium leaving said steadying zone in an accelerated flow through said inlet of the next exchange zone, said inlets and outlets of each of said exchange zones being arranged and aligned so that said relatively heavy medium sweeps said exchange zones in substantially the same directions as said relatively light medium issuing from said inclined passages, whereby equally directed rotations are imparted to said relatively heavy and light media in said exchange zones, said steadying zones causing said relatively heavy and light media to dissociate from each other.

7. In a structure as claimed in claim 6, said inlets for said relatively heavy medium having at the transitions from said steadying zones into said exchange zones a cross section being smaller than the cross section of said outlets.

8. In a structure as claimed in claim 6, each of said contact plates being subdivided into a plurality of sectors arranged in diametrically opposite and subsequent pairs, one of said pairs forming a steadying zone for said relatively heavy medium, the subsequent pair of sectors following said one pair in the direction of flow of said relatively heavy medium forming an exchange zone, the next pair of sectors following said sectors formed as an exchange zone forming passages for enabling said relatively heavy medium to escape to the next lower contact plate, said sectors of said next lower contact plate arranged below said passages being formed as steadying zones, whereas the sectors of said next lower contact plate corresponding, respectively, to said steadying zones and said exchange zones of the next upper contact plate are designed as passages.

9. In a structure as claimed in claim 6, said contact plate being subdivided into three concentrically arranged zones including an inner zone, an outer zone, and a medium zone arranged so as to be contiguous with said inner and outer zones, said medium zone being formed as an exchange zone, one of said outer and inner zones being formed as a steadying zone and the other of said outer and inner zones being formed as a discharge zone.

10. In a structure as claimed in claim 9, said structure including at least two contact plates arranged one above the other, said steadying zone of the upper one of said contact plates having passages leading to said exchange zone of said lower one of said contact plates.

11. In a structure as claimed in claim 10, and guide plates arranged at the transitions from said steadying zones to said exchange zones.

12. In a structure as claimed in claim 11, said guide plates being inclined and forming a ring causing a twist of said relatively heavy medium passing therethrough.

References Cited in the file of this patent

UNITED STATES PATENTS

| | | |
|---|---|---|
| 581,439 | Sneath | Apr. 27, 1897 |
| 764,049 | Guldlin | July 5, 1904 |
| 1,782,735 | MacKenzie | Nov. 25, 1930 |
| 2,091,349 | Bergman | Aug. 31, 1937 |
| 2,501,114 | Whaley | Mar. 21, 1950 |
| 2,568,749 | Kittel | Sept. 25, 1951 |
| 2,570,215 | Dice | Oct. 9, 1951 |

FOREIGN PATENTS

| | | |
|---|---|---|
| 142,786 | Austria | Sept. 10, 1935 |
| 632,450 | France | Oct. 4, 1927 |
| 655,087 | Germany | Jan. 8, 1938 |
| 886,614 | France | July 5, 1943 |